July 26, 1932.  E. S. MARIS  1,869,109
RELAY INSTRUMENT
Filed June 21, 1930
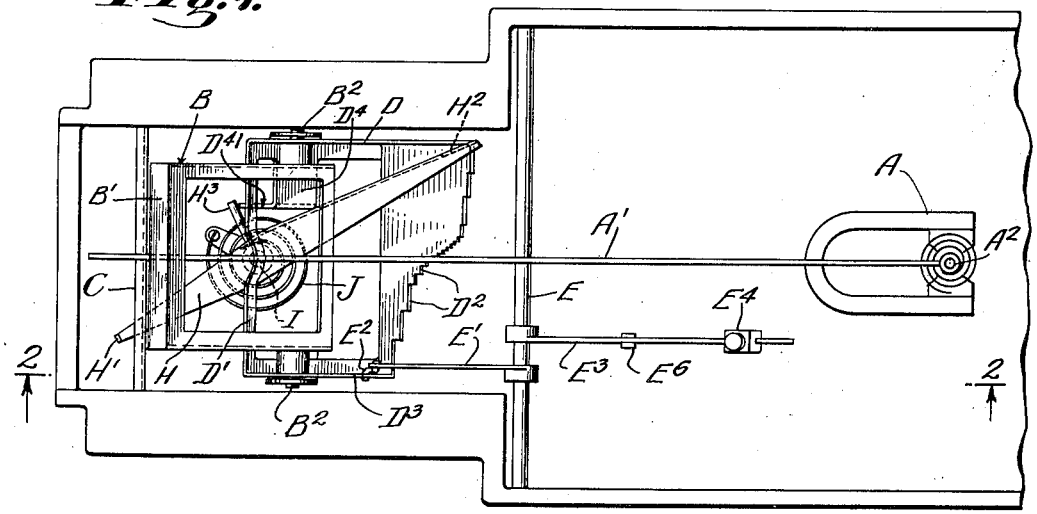
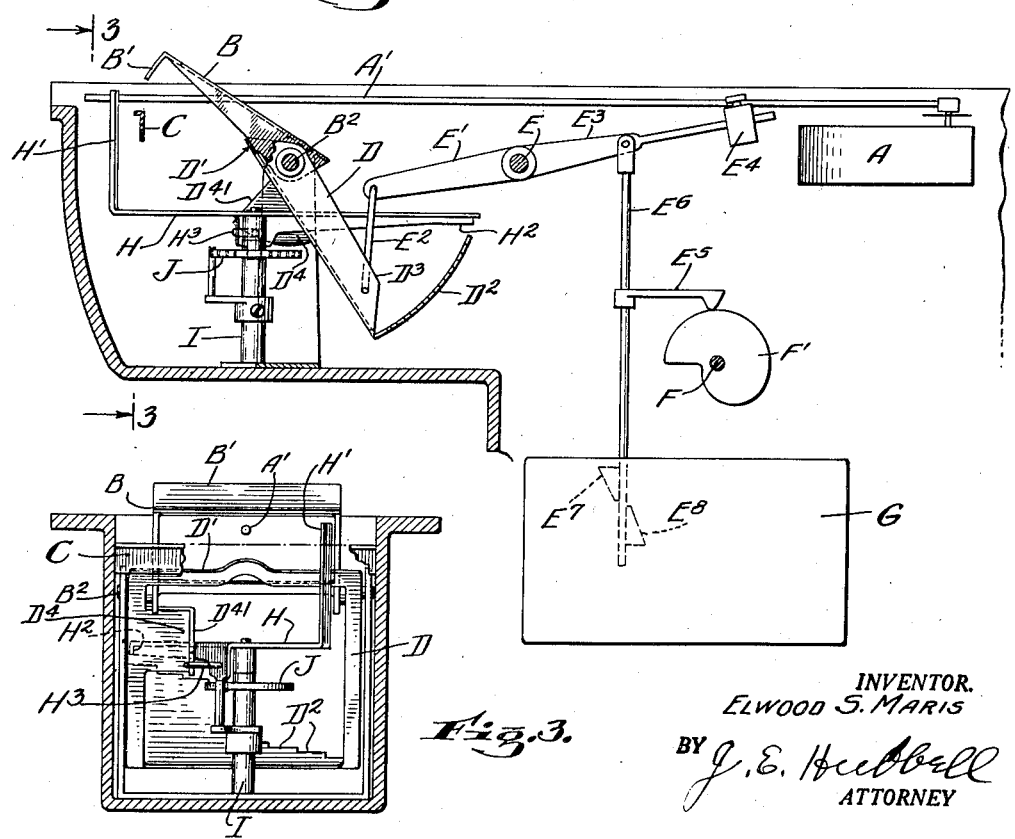
INVENTOR.
ELWOOD S. MARIS
BY J. E. Hubbell
ATTORNEY Patented July 26, 1932

1,869,109

UNITED STATES PATENT OFFICE

ELWOOD S. MARIS, OF UPPER DARBY, PENNSYLVANIA, ASSIGNOR TO THE BROWN INSTRUMENT COMPANY, OF PHILADELPHIA, PENNSYLVANIA, A CORPORATION OF PENNSYLVANIA

RELAY INSTRUMENT

Application filed June 21, 1930. Serial No. 462,732.

My present invention relates to instruments of the kind in which the pointer of a galvanometer or other meter is used to periodically control the actuation of a relay mechanism which may perform one or more of various functions. For example, such a relay mechanism may be employed to control the supply of heat to a furnace, some temperature condition of which is measured by the meter, or when the instrument is a potentiometer instrument, the relay mechanism may be employed to adjust the exhibiting element of the instrument and to rebalance the potentiometer.

The general object of the present invention is to provide simple and effective means for periodically adjusting a relay controlling element into a position dependent upon the then deflection of the galvanometer pointer from a normal or neutral position without subjecting the pointer to objectionably heavy mechanical stress.

The various features of novelty which characterize my invention are pointed out with particularity in the claims annexed to and forming a part of this specification. For a better understanding of the invention, however, and the advantages possessed by it reference should be had to the accompanying drawing and descriptive matter in which I have illustrated and described a preferred embodiment of the invention.

Of the drawing:—

Fig. 1 is a plan view of a portion of an instrument including relay control provisions;

Fig. 2 is a section on the line 2—2 of Fig. 1; and

Fig. 3 is a front elevation of the apparatus shown in Figs. 1 and 2, with a portion of the casing in section.

In the drawing I have illustrated an instrument embodying a preferred form of the present invention. The instrument shown comprises a meter element A, which may be an ordinary galvanometer having a pointer $A'$ normally free to deflect about an axis $A^2$. The pointer $A'$ is periodically engaged by a depressor element B and moved by the latter into engagement with a stationary abutment C, between which and the depressor B, the pointer $A'$ is then temporarily held stationary.

The depressor element B comprises a bar-like pointer engaging portion $B'$ generally transverse to the length of the pointer and normally elevated above the plane of the latter. The ends of this bar-like portion of the depressor element are secured to the ends of the side arm or bar parts of the depressor B, which are pivotally mounted on pivot pins $B^2$ carried by the instrument frame work.

The depressor B is normally held out of engagement with the pointer $A'$ by a depressor actuator D, comprising a cross bar portion $D'$ extending under the side arms of the depressor and normally engaging said arms and holding them in the elevated position shown in the drawing. Said cross bar portion $D'$ is connected at its ends to side arm parts of the member D, which are pivoted on the pivot pins $B^2$. The side parts of the member D are also connected at the rear of the pivots $B^2$, by a second cross bar part, the upper edge of which is askew to the axis of the pivots $B^2$, and is preferably shaped to provide stepped shoulders $D^2$ for a purpose hereinafter set forth.

One arm $D^3$ of the member D is connected by a link $E^2$ to an arm $E'$ secured to a rock shaft E which is journalled in the instrument frame work. The rock shaft E as shown, has secured to it a second arm $E^3$ carrying a counter-weight $E^4$, which tends to turn the shaft E in the clockwise direction as seen in Fig. 2, out of the position shown in the drawing. In the position shown, the link $E^2$ holds the member D in the position in which its cross bar portion $D'$ holds the depressor B out of engagement with the pointer $A'$. When the rock shaft E is permitted to turn under the action of the weight $E^4$, the portion $D'$ of the member D is lowered, and the depressor B then turns under the action of gravity until its portion $B'$ depresses the pointer $A'$ into engagement with the abutment C.

Normally the rock shaft E is held in the position shown in the drawing, but at periodic intervals the rock shaft is released and permitted to turn under the action of gravity until its motion is arrested, as hereinafter described, when in a position dependent upon the then position of the meter pointer A'. When its turning movement is thus arrested, the angular position of the shaft E, or the position of some part associated therewith, selectively controls the actuation of the relay mechanism.

The details of the mechanism giving the shaft E its turning movement in a direction opposite to that in which it tends to turn under the action of gravity, and by which the position of the shaft E, or some part actuated thereby, controls the relay mechanism, and of the relay mechanism itself, need not be illustrated and described herein as such details may be of various known forms and constitute no novel feature or part of the present invention. As diagrammatically and conventionally illustrated, the shaft E is periodically turned into, and held in the position shown by means of a shaft F completing successive rotations at regular intervals of time and carrying a cam F', the dwell portion of which normally supports a projection $E^5$ from a depending rod $E^6$ connected at its upper end to the arm $E^3$. In the diagrammatic illustration G represents the relay mechanism which may be selectively controlled by the vertical positions of selector cams $E^7$ and $E^8$, carried by the rod $E^6$.

The means employed to limit the movement of the shaft E under the action of gravity in accordance with the then position of the pointer A', when the cam F' periodically turns to permit downward movement of the projection $E^5$, includes a pointer engaging selector element H. The element H is in the form of a lever pivoted intermediate its ends on a vertical shaft I located below the pointer A', when the latter is in its neutral position. The front end H' of the lever H is upturned and engages the pointer A' when the lever H is turned as hereinafter described, from its neutral position which is that shown in Fig. 1.

At its rear end, the member H is formed with a depending flange or edge $H^2$ adapted to engage with one or another of the stepped shoulders $D^2$ formed on the rear cross bar portion of the member D. A spiral spring J coiled about the shaft I has its outer end connected to an arm secured to the shaft I, and preferably angularly adjustable with respect thereto. The inner end of the spring J is connected to the member H and constantly tends to turn the latter from the position shown in Fig. 1 into the position in which its upturned end H' engages the pointer A'.

Normally, the member H is held in the position shown in the drawing, by a cam part $D^4$ of the member D engaged by a projection $H^3$ from the member H. After a small initial movement of the member D from the position shown in the drawing, the position of the cam $D^4$ becomes such that the projection $H^3$ engages the edge $D^{41}$ of the cam, and as the turning movement of the cam continues, the recession of the edge $D^{41}$ permits the member H to turn in the counterclockwise direction, as seen in Fig. 1, until its motion is arrested by the engagement of the projection H' with the pointer A'. Shortly after the turning movement of the member H is thus arrested, the continued turning movement of the member D brings one or another of the stepped shoulders $D^2$ of the member D, against the flange $H^2$ of the member H, whereupon the gravital turning movements of the member D and the shaft E are arrested. The positions assumed by the selector cams E' and $E^8$ at this time, determine the direction or magnitude, or both the magnitude and direction of a subsequent actuation of the relay mechanism G.

The relay control mechanism described is relatively simple and inexpensive to construct, and reliable in action and may readily be so designed and proportioned as to positively control the relay mechanism without subjecting the pointer A' to objectionable stress.

The pointer engaging parts B and H may well be sheet metal stampings which are not only inexpensive to make, but may be readily made light in weight and of little inertia, so that but little force is required to arrest their motions when they engage the pointer. The weight of the bar portion B' of the depressor and the side arm portions of the latter between the bar B' and the pivot pins $B^2$ is partially counter-balanced by the weight of the portion of the depressor B at the opposite side of the pivots $B^2$ from the bar B'. By suitably proportioning the parts of the depressor the gravital force with which the bar B' is urged into engagement with the pointer A', may be made as small as is desirable. The helical spring J acting on the lever member H may obviously be arranged to impress a torque on the member H as small as may be desirable. Furthermore, the tension of the spring J does not give a velocity to the member H which increases as the movement of the member H away from its normal position proceeds because the rate of such movement is positively controlled by the engagement of the portion $H^3$ of the member H with the cam part $D^3$ of the member D and hence is determined by the velocity of turning movement of the member D.

It will be observed that in operation the member D forms a means for periodically returning the depressor B and the member H to their normal positions, and that while limiting the maximum velocity of the member B and member H toward the pointer it does not force the depressor B and member H into engagement with the pointer, but merely permits such engagement to be effected by independent forces which may be made as small as is practically desirable.

The inclination of the edge of the portion D which engages the member H, to the plane of oscillation of the latter, may be varied as required to obtain any suitable relation between any particular deflection of the element A, and the corresponding position of the member D when its motion is arrested. When one or another of the stepped shoulders $D^2$, which said inclined edge is preferably shaped to provide, engages the edge $H^2$ of the member H, the engaging force acts on the pointer in a vertical plane, and hence the impact of the member D on the member H is not transmitted by the projection $H'$ to the pointer $A'$.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The combination with a deflecting element, of a member movable along the deflection path of a portion of said element into and out of engagement with said portion, means for periodically moving said member from a position at one end of said path into a position in which said member engages and has its motion arrested by said portion, and mechanism selectively controlled by and in accordance with the position of said member when its motion is so arrested, said mechanism including a part normally separated from said member but moved into engagement therewith when the motion of said member is arrested.

2. The combination with an element deflecting about an axis, of a member pivoted to turn about an axis parallel to the first mentioned axis, means periodically turning said member from a position at one side of said element into a position in which it engages the latter, and mechanism selectively controlled by and in accordance with the angular position of said member at the time of its engagement with said element, said mechanism including a part normally separated from said member but moved into engagement therewith when the motion of said member is arrested.

3. The combination with an element deflecting about an axis, of a member periodically turning about an axis parallel to the first mentioned axis from a position at one side of said element into a position in which it engages the latter, a second member periodically moving transversely to the plane of deflection of said element into engagement with the first mentioned member, said members having engaging surfaces so relatively shaped that when said members engage said second member occupies different positions according to the angular position of the first mentioned member, means for giving said members their movements in such timed relation that the first mentioned member engages said element prior to the engagement of said members, and mechanism selectively actuated in accordance with the angular position of said second member at the time of its engagement with the first mentioned member.

4. The combination with a deflecting element, of a member extending through the plane of deflection of said element and pivoted to turn toward and away from said element about an axis transverse to said plane, a periodically moving device having a surface which in one portion of the movement face of said device engages said member and moves the latter away from said element and in another portion of said movement tends to move out of engagement with said member, means tending to move said member toward said element and maintain said engagement but yielding to permit the motion of said member to be interrupted by said element on engagement with the latter, said device comprising another portion normally out of engagement with said member but brought into engagement with the latter by the further movement of said actuator occurring after the movement of said member is arrested by its engagement with said element.

5. The combination with a deflecting element, of a member extending through the plane of deflection of said element and pivoted to turn toward and away from said element about an axis transverse to said plane and having a tendency to turn toward said element until its movement is arrested by engagement with the latter, and a periodically moving device having a surface which in one portion of the movement of the device engages said member and moves the latter away from said element and in another portion of said movement permits said member to move toward said element until it engages the latter, said device having another surface normally out of engagement with said member but brought into engagement with the latter and thereby arresting the movement of said device on a movement of the latter occurring after said member engages said element.

6. The combination with a deflecting element, of a member extending through the plane of deflection of said element and pivoted to turn toward and away from said element about an axis transverse to said plane and having a tendency to turn toward said element until its movement is arrested by engagement with the latter and a periodically moving device having a surface which in one portion of the movement of the device engages said member and moves the said portion thereof away from said element and in another portion of said movement permits said member to move toward said element until it engages the latter, said member and device having cooperating surfaces normally out of engagement with the latter and thereby arresting the movement of said device on a movement of the latter occurring after said member engages said element, said last mentioned surfaces being so relatively disposed that the position of said device when its motion is arrested by said member is dependent on and varies with the angular position of said member.

7. The combination with a deflecting element, of a depressor member and a selector member pivoted to turn about axes transverse to each other and each tending to move into engagement with said element, a periodically moving device alternately moving said members away from, and permitting them to move into engagement with the element, said selector member and device having cooperating provisions whereby said selector member, while in engagement with said element, interrupts the movement of said device and temporarily maintains the latter in a position dependent upon the then position of said element.

8. The combination with a deflecting element, of a member extending through the plane of deflection of said element and pivoted to turn toward and away from said element about an axis transverse to said plane and tending to turn into engagement with said element, and a periodically moving device pivoted to turn about an axis parallel to said plane and periodically turning from one position in which said device holds said member out of engagement with said element, to permit said member to move toward and into engagement with said element, having an engaging surface moved into engagement with said member by movement of the device occurring after said member engages said element, said surface being inclined to the direction of its movement into engagement with said member whereby the position of said device, when said surface engages said member, depends upon the then position of said element.

9. The combination with a deflecting element and means for periodically clamping said element in a position of deflection, of a member movable along the deflection path of a portion of said element into and out of engagement with said portion when the deflecting element is clamped, means for periodically moving said member from a position at one end of said path into a position in which said member engages and has its motion arrested by said portion, and mechanism selectively controlled by and in accordance with the position of said member when its motion is so arrested, said mechanism including a part normally separated from said member but moved into engagement therewith when the motion of said member is arrested.

10. The combination with a deflecting element, of a member moving periodically along the deflection path of a portion of said element into and out of engagement with said portion, a depressor moving periodically into and out of engagement with said element, a periodically moving device operatively engaging said member and depressor and thereby giving each of the latter its periodic movements in one direction relative to said element, said device including a part moved toward and away from the plane of deflection of said element into and out of engagement with said member on the periodical movements of said device, said part and member having engaging surfaces so shaped and disposed that the position of said part will vary with the position of said element and said member on their engagement, means for giving said device its periodical movements, and mechanism selectively controlled by the position of said device when said part engages said member.

Signed at Philadelphia in the county of Philadelphia and State of Pennsylvania, this 13th day of June, A. D. 1930.

ELWOOD S. MARIS.